May 22, 1923.
H. F. ANDRICH
PNEUMATIC TIRE CASING
Filed April 11, 1921
1,455,855
2 Sheets-Sheet 1
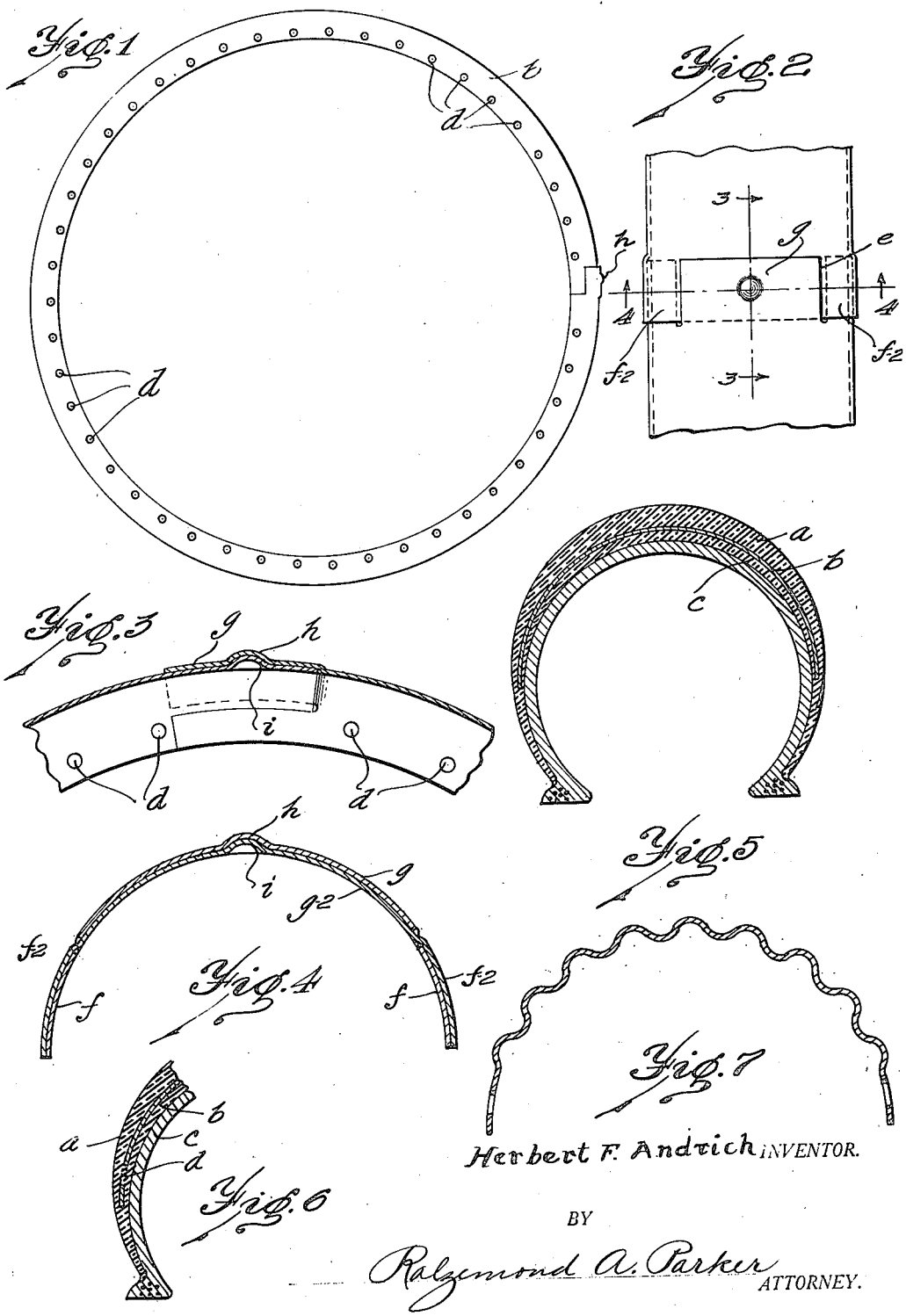

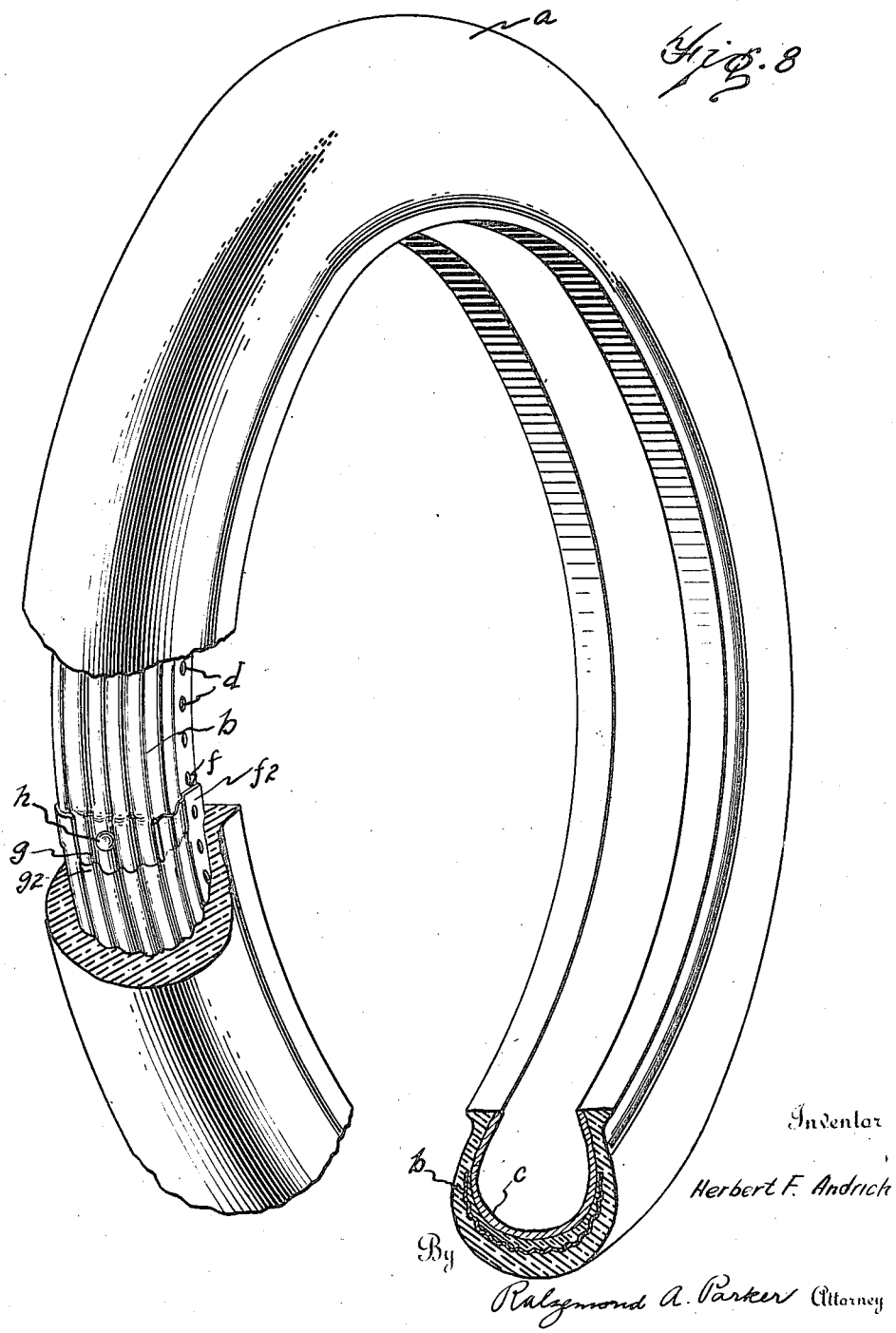

Patented May 22, 1923.

1,455,855

UNITED STATES PATENT OFFICE.

HERBERT F. ANDRICH, OF DETROIT, MICHIGAN.

PNEUMATIC-TIRE CASING.

Application filed April 11, 1921. Serial No. 460,354.

*To all whom it may concern:*

Be it known that I, HERBERT F. ANDRICH, subject of the King of Great Britain, residing at Detroit, county of Wayne, State of Michigan, have invented a certain new and useful Improvement in Pneumatic-Tire Casings, and declare the following to be a full, clear, and exact description of the same, such as will enable others skilled in the art to which it pertains to make and use the same, reference being had to the accompanying drawings, which form a part of this specification.

My invention relates to an improved form of pneumatic tire casing in which a metal strip is provided between the outer rubber tread portion of the tire and the fabric or cord backing which metal strip is securely vulcanized in position and which is of such a character as to prevent puncture of the tire.

Broadly the object is to provide an improved form of tire casing which is puncture proof, however, it is known that metal plates have been provided both inside and outside the casing to perform this purpose.

Particularly, however, my invention relates to the provision of a sheet metal strip curved to conform to the curvature of the tire, free ends of which strip are adapted to be easily and securely locked together so as to prevent longitudinal movement relative each other and so locked that they bear against each other and do not exert end thrust on the casing material.

A further object is the provision of such a tire casing in which the embedded metal strip is provided with a series of perforations arranged circumferentially, which perforations, when the strip is vulcanized in place, are filled with the rubber material of the casing to securely fix the metal strip in position.

A further object is to provide a tire casing provided with an embedded metal strip securely vulcanized in place between the outer rubber tread of the casing and the inner fabric or cord backing and so formed and shaped as to prevent any slipping of the metal relative the casing material so that the casing material will not be chafed or worn by the metal strip. Free ends of this strip are so locked together as to bear against each other in such a manner as to prevent relative movement and likewise prevent chafing of the casing material in which the metal strip is embedded.

A further object is to provide a metal strip, the ends of which are slotted so as to interlock with each other and provided with means so as to engage each other in such a manner as to be locked securely together due to the inherent spring tension in the metal itself.

These and other objects of the invention will more fully appear together with the details of construction from the within description and appended claims together with the accompanying drawings, in which:

Figure 1 is an elevation of the metal strip removed.

Fig. 2 is a plan of a fragmentary section.

Fig. 3 is a longitudinal section taken on line 3—3 Fig. 2.

Fig. 4 is a horizontal section taken on line 4—4 Fig. 2.

Fig. 5 is a section through a tire casing showing my metal plate in position.

Fig. 6 is a fragmentary section.

Fig. 7 is a section of a modification taken on the same line as 4—4 Fig. 2.

Fig. 8 is a perspective of my improved tire casing partly broken away to show the metal plate.

In the drawings let *a* indicate the rubber tread portion of a tire casing, *b* my improved form of protective metal plate curved to conform with the curvature of the casing, and *c* the backing of the tire casing which may be either of fabric or cord. My metal plate *b* is provided with a series of perforations arranged circumferentially, one series on each side of the plate near its annular edge. When the metal plate is vulcanized in place against the rubber tread portion of the tire the rubber material passes through these perforations *d* and securely fixes the metal plate in position so as to prevent any movement of the plate relative the tread material. This will prevent chafing of the rubber material of the casing due to the movement of the metal thereover.

The free ends of the metal strip are adapted to be easily locked together so as to bear against one another and not exert end thrust on the casing material. In order that the ends of the metal strip may be so locked together one end is adapted to overlap the other and the opposite ends are provided with registering slots which interlock with each other. The side tongue portions $f$ of one end being received under the corresponding tongue portions $f^2$ of the other end while the center tongue piece $g$ overlaps the center tongue piece of the other end $g^2$. The overlapping center tongue $g$ is provided with a cavity $h$ adapted to receive a button $i$ carried by the tongue portion $g^2$. These tongue portions are held together so as to retain the button in position in the cavity by virtue of the spring tension in the metal.

In the construction of my improved type of casing the metal plate is inserted between the outer rubber tread portion of the tire and the inner fabric or cord portion.

In Fig. 7 I show a modified form of construction in which my metal plate is longitudinally ribbed or corrugated. This form of construction provides a plate of great strength with correspondingly light weight and the plate would also form such a joint with the rubber portion of the tread when vulcanized in position as to be secured against any movement relative the casing material.

What I claim is:

An improved casing for pneumatic tires composed of a rubber tread portion, a fabric backing for the tread portion, a one-piece concaved longitudinally-corrugated metal plate interposed between said rubber tread and fabric backing, said plate provided with a marginally disposed series of perforations on each side thereof through which the rubber of the tread extends and adheres to the fabric backing on the opposite side of the plate, the free ends of said plate provided with registering slotted portions adapted to co-act to receive end thrust and interlock together against relative movement.

In testimony whereof, I sign this specification.

HERBERT F. ANDRICH.